US009276918B2

(12) United States Patent
Araki et al.

(10) Patent No.: US 9,276,918 B2
(45) Date of Patent: Mar. 1, 2016

(54) COMPUTER-READABLE MEDIUM, INFORMATION PROCESSING DEVICE, INFORMATION PROCESSING METHOD AND INFORMATION PROCESSING SYSTEM

(71) Applicant: NINTENDO CO., LTD., Kyoto (JP)

(72) Inventors: Tsutomu Araki, Kyoto (JP); Kentaro Mita, Kyoto (JP); Keishi Ohno, Kyoto (JP); Hironari Makiuchi, Kyoto (JP); Kuniharu Fujikawa, Kyoto (JP); Kyohei Nakano, Kyoto (JP); Megumi Kurata, Kyoto (JP); Kalinda Raina, Redmond, WA (US)

(73) Assignee: NINTENDO CO., LTD., Kyoto (JP)

( * ) Notice: Subject to any disclaimer, the term of this patent is extended or adjusted under 35 U.S.C. 154(b) by 449 days.

(21) Appl. No.: 13/685,012

(22) Filed: Nov. 26, 2012

(65) Prior Publication Data
US 2013/0174227 A1 Jul. 4, 2013

(30) Foreign Application Priority Data
Nov. 25, 2011 (JP) ................. 2011-258277

(51) Int. Cl.
H04L 29/06 (2006.01)
H04L 9/32 (2006.01)
G06F 21/00 (2013.01)

(52) U.S. Cl.
CPC ............ *H04L 63/08* (2013.01); *H04L 63/0861* (2013.01); *G06F 21/00* (2013.01); *H04L 9/32* (2013.01); *H04L 29/06* (2013.01); *H04L 63/102* (2013.01)

(58) Field of Classification Search
USPC ........................................ 726/4, 17
See application file for complete search history.

(56) References Cited

U.S. PATENT DOCUMENTS

| | | | |
|---|---|---|---|
| 5,630,006 A | 5/1997 | Hirayama et al. | |
| 5,675,695 A | 10/1997 | Hirayama et al. | |
| 5,729,650 A | 3/1998 | Hirayama et al. | |
| 5,732,185 A | 3/1998 | Hirayama et al. | |
| 5,742,731 A | 4/1998 | Hirayama et al. | |
| 5,793,872 A | 8/1998 | Hirayama et al. | |
| 5,819,003 A | 10/1998 | Hirayama et al. | |
| 5,832,175 A | 11/1998 | Hirayama et al. | |
| 5,911,032 A | 6/1999 | Hirayama et al. | |
| 5,956,457 A | 9/1999 | Hirayama et al. | |
| 2003/0182585 A1* | 9/2003 | Murase et al. | ................ 713/202 |

(Continued)

FOREIGN PATENT DOCUMENTS

| | | |
|---|---|---|
| JP | 2003-271966 | 9/2003 |
| JP | 2007-235716 | 9/2007 |

(Continued)

*Primary Examiner* — Brandon Hoffman
*Assistant Examiner* — Samuel Ambaye
(74) *Attorney, Agent, or Firm* — Nixon & Vanderhye P.C.

(57) ABSTRACT

An example system causes a computer of an information processing device including a restriction unit for restricting use of functions and a handwritten input receiving unit to carry out functions of requesting an input of a handwritten signature, sending, to a server, a result of a handwritten input which has been input in response to the request of the signature input, and receiving the input of authorization information which has been issued by the server that has received the handwritten input result and which shows that the use of the functions is authorized, and moreover cancelling the restriction by the restriction unit when the input of the authorization information is received.

19 Claims, 7 Drawing Sheets

(56) References Cited

U.S. PATENT DOCUMENTS

| | | | |
|---|---|---|---|
| 2007/0188793 A1* | 8/2007 | Wakai | 358/1.14 |
| 2009/0220162 A1* | 9/2009 | Clary et al. | 382/246 |
| 2012/0113135 A1* | 5/2012 | Sakai et al. | 345/619 |

FOREIGN PATENT DOCUMENTS

| | | |
|---|---|---|
| JP | 2008-077442 | 4/2008 |
| JP | 2009-134442 | 6/2009 |
| WO | WO 95/12197 | 5/1995 |

* cited by examiner

COMPUTER-READABLE MEDIUM, INFORMATION PROCESSING DEVICE, INFORMATION PROCESSING METHOD AND INFORMATION PROCESSING SYSTEM

This application is based upon and claims the benefit of priority of the prior Japanese Patent Application No. JP2011-258277, filed on Nov. 25, 2011, the entire contents of which are incorporated herein by reference.

FIELD

The present disclosure relates to technology of authorizing a user to use a predetermined function based on an approval of an administrator.

BACKGROUND AND SUMMARY

An example of an information processing program according to the present disclosure is an information processing program for causing a computer of an information processing device including a restriction unit for restricting use of functions of the information processing device and a handwritten input receiving unit to function as a signature input request unit for requesting an input of a handwritten signature, an input result sending unit for sending, to a server, a result of a handwritten input which has been input in response to the request from the signature input request unit and received by the handwritten input receiving unit, an authorization information input receiving unit for receiving an input of authorization information which has been issued by the server that received the result of the handwritten input and which shows that the use of the functions of the information processing device is authorized, and a restriction cancellation unit for cancelling the restriction by the restriction unit, wherein the restriction cancellation unit cancels the restriction by the restriction unit when the input of the authorization information is received.

With the present disclosure, in the information processing device comprising the handwritten input receiving unit, the handwritten signature received by the handwritten input receiving unit is sent to the server, and the authorization information issued by the server is input in response.

In addition, when the input of the authorization information is received, the restriction by the restriction unit is cancelled.

According to the present disclosure, by comprising this kind of configuration, procedures for obtaining the approval for authorizing the user to use a predetermined function can be efficiently performed.

Moreover, the signature input request unit may request the input of the handwritten signature when the input of the authorization information has not been received upon executing software operation in the information processing device, and the restriction cancellation unit may cancel the restriction by the restriction unit when the input of the authorization information has been received upon executing software operation in the information processing device.

Moreover, the restriction unit may impose restriction of the use of the function on a user of the information processing device, and the signature input request unit may request an input of the handwritten signature by an administrator of the user who is different from the user.

Moreover, the information processing program according to the present disclosure may also cause the computer to function further as a transmission destination input receiving unit for receiving from the administrator an input which designates a transmission destination of the authorization information issued by the server, and a transmission destination notifying unit for notifying the server of the transmission destination of the authorization information that has been received by the transmission destination input receiving unit, wherein the authorization information input receiving unit may receive the input of the authorization information issued by the server and received by a termination designated as the transmission destination.

As a result of causing the transmission destination of the authorization information to be the transmission destination designated by the administrator, the issued authorization information can be sent to a terminal that is convenient for the administrator.

Moreover, the transmission destination input receiving unit may receive an input which designates a terminal that is different from the information processing device used by the user as the transmission destination of the authorization information.

As a result of causing the transmission destination of the authorization information to be a terminal that is different from the information processing device that is being used by the user, it is possible to inhibit the unauthorized acquisition of the authorization information by a user who has not obtained the approval of the administrator.

Here, the transmission destination input receiving unit may receive an input which designates an email address of emails to be received by a terminal that is different from the information processing device used by the user as the transmission destination of the authorization information.

Moreover, the authorization information input receiving unit may receive an input of the authorization information based on an operation by the administrator.

As a result of inputting the authorization information sent from the server via the administrator's operation, it is possible to inhibit the authorization information from being input without going through the administrator.

Moreover, the information processing program according to the present disclosure causes the computer to function further as an association unit for associating the authorization information, the input of which has been received by the authorization information input receiving unit, with a password set by the administrator, a password input receiving unit for receiving an input of the password set by the administrator upon executing software operation in the information processing device, and a password determination unit for determining whether the input password, the input of which has been received by the password input receiving unit, coincides with the set password set by the administrator, wherein the restriction cancellation unit may cancel the restriction by the restriction unit when the password determination unit determines that the input password and the set password coincide.

As a result of associating the authorization information, the input of which has been received, with the password set in the information processing device and thereby once associating the password and the authorization information, the restriction by the restriction unit can thereafter be efficiently cancelled by using the password.

Moreover, the information processing program according to the present disclosure causes the computer to function further as a user age determination unit for determining whether the user of the information processing device is under a predetermined age, wherein the signature input request unit may request an input of the handwritten signature by the administrator when the user age determination unit determines that the age of the user is under the predetermined age.

Moreover, the information processing program according to the present disclosure causes the computer to function further as an estimation unit for estimating whether the administrator is a guardian of the user by determining whether the administrator is at or above a predetermined age, wherein the input result sending unit may send the result of the handwritten input to the server when the estimation unit estimates that the administrator is the guardian of the user.

Moreover, the authorization information may be sent from the server by using a communication method that is different from a communication method which enables reception of the authorization information by the information processing device.

As a result of using, for sending the authorization information from the server, a communication method that is different from a communication method which enables reception of the authorization information by the information processing device, it is possible to inhibit a user who has not obtained the administrator's from wrongfully inputting the authorization information, without going through the administrator, by using the information processing device.

Moreover, the information processing program according to the present disclosure causes the computer to function further as an information sharing unit for sharing predetermining information with the server that has received the result of the handwritten input, and an authorization information determination unit for determining whether the authorization information, the input of which has been received by the authorization information input receiving unit, has been issued by the server by using the predetermined information, wherein the restriction cancellation unit may cancel the restriction by the restriction unit when the authorization information determination unit determines that the authorization information, the input of which has been received, has been issued by the server.

As a result of confirming whether the input authorization information is authentic by using the predetermined information shared between the information processing device and the server, it is possible to inhibit the restriction by the restriction unit from being cancelled based on the input of wrongful authorization information.

Moreover, the information processing program according to the present disclosure causes the computer to function further as an input result determination unit for determining whether attribute information pertaining to the handwritten input result satisfies predetermined conditions in the handwritten input result received by the handwritten input receiving unit, wherein the input result sending unit may send the handwritten input result to the server when the input result determination unit determines that the attribute information satisfies the predetermined conditions.

Moreover, the input result determination unit may determine whether a ratio of a handwritten portion relative to a handwritable area is within a predetermined range in the handwritten input result received by the handwritten input receiving unit, and the input result sending unit may send the handwritten input result to the server when the input result determination unit determines that the ratio of the handwritten portion relative to the handwritable area is within the predetermined range.

By determining whether the ratio of the handwritten portion relative to the handwritable area in the handwritten input result is within a predetermined range, it is possible to efficiently determine whether the handwritten signature is appropriate.

Moreover, the present disclosure can also be understood to be a method that is executed by a computer, or a program to be executed by a computer.

Moreover, the present disclosure may also be an item in which the foregoing program is recorded in a recording medium that can be read by a computer or other devices and machines.

Here, a recording medium that can be read by a computer and the like refers to a recording medium which electrically, magnetically, optically, mechanically or chemically accumulates information such as data and programs, and which can be read by a computer and the like.

DETAILED DESCRIPTION OF NON-LIMITING EXAMPLE EMBODIMENTS

Embodiments of the present disclosure are now explained with reference to the appended drawings. Note that the embodiments explained below are merely examples upon implementing the present disclosure, and are not intended to limit the present disclosure to the specification configuration explained below. Upon implementing the present disclosure, a specific configuration according to the embodiments may be adopted as needed. For example, the present disclosure may also be applied to an information processing program, an information processing system and an information processing method that are executed by a general computer, as well as to a game program, a game device, a game system and a game method, and can also be applied to an audio or visual reproduction program, a reproduction device, a reproduction system and a reproduction method.

<Configuration of System and Device>

Figure 1:
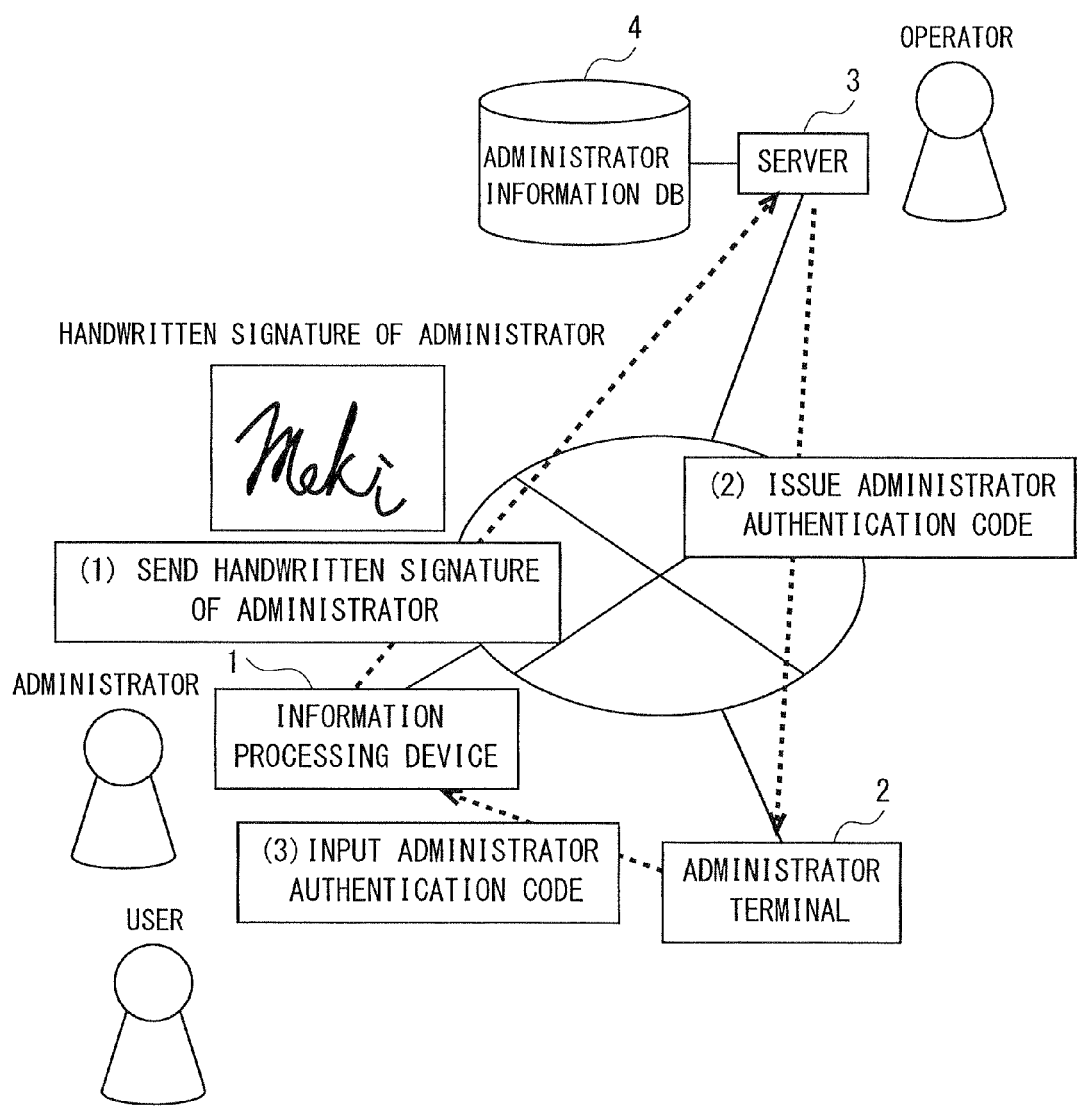
FIG. 1 shows an example of a non-limiting diagram schematically showing the configuration of the information processing system.

FIG. 1 is a diagram schematically showing the configuration of the information processing system according to this embodiment. The information processing system according to this embodiment comprises an information processing device 1, an administrator terminal 2, a server 3 and an administrator information database 4 which are communicably connected via a network such as the internet.

The information processing device 1 is managed by an administrator, and is an information processing device that can be used by a user who is different from the administrator. For example, when the user is a child under a predetermined age, the administrator is a guardian (parent) of that user. As this kind of information processing device, for example, considered may be a game device or the like which is managed by the guardian as the administrator, and used by the child under the protection of the guardian.

The administrator terminal 2 is a computer terminal to be used by the administrator, and more preferably is a terminal that is not used by any user other than the administrator. As the administrator terminal 2, used may be, for instance, a personal computer or a mobile phone terminal capable of receiving emails addressed to the administrator.

The server 3 is a computer which, in the information processing system according to this embodiment, obtains the approval of the administrator regarding the use of a predetermined function of the information processing device 1 by the user, and issues authorization information showing that the use of the predetermined function is authorized. In this embodiment, administrator information including the administrator's handwritten signature is acquired as the information showing the administrator's approval, and an administrator authentication code is used as the authorization information. Here, when the server 3 acquires the administrator information, the server 3 retains such administrator information in the administrator information database 4 and issues the authorization information. In other words, the administrator authentication code is a code showing that the administrator information, which shows that the administrator has approved the cancellation of the usage restriction, has been received by the server 3. Note that the server 3 may be realized with a single device, but it may also be realized, for example, via a plurality of computers mounted in a cloud or the like.

Figure 2:
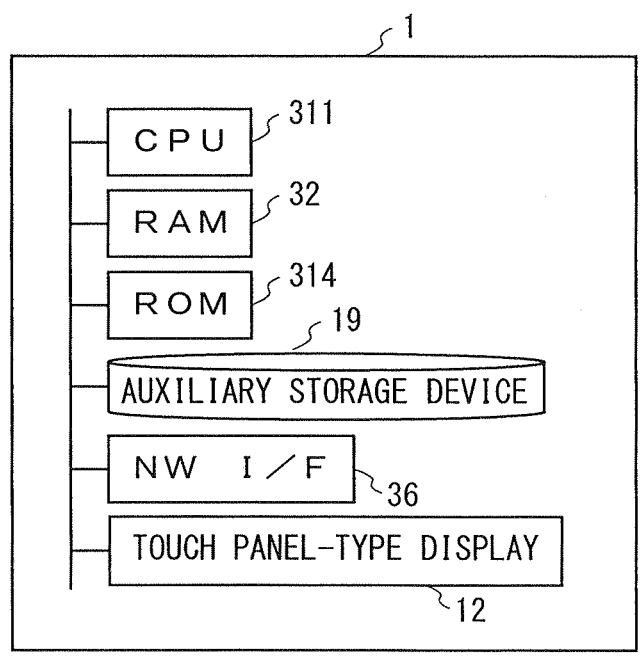
FIG. 2 shows an example of a non-limiting diagram schematically showing the hardware configuration of the information processing device.

FIG. 2 is a diagram schematically showing the hardware configuration of the information processing device 1 according to this embodiment. The information processing device 1 is an information processing device in which a central processing unit (CPU) 311, a random access memory (RAM) 32, a read only memory (ROM) 314, an auxiliary storage device 19, a network interface 36 for communicating with the outside via a network, and a touch panel-type display 12 are electrically connected. Note that, with respect to the specific hardware configuration of the information processing device 1, the constituent elements may be omitted, substituted or added as needed in accordance with the embodiments.

The CPU 311 is a central processing unit, and controls the respective components of the information processing device 1 such as the RAM 32 and the auxiliary storage device 19 by processing the command and data stored in the RAM 32, the ROM 314 and the like. Moreover, the RAM 32 is a main storage device, and is controlled by the CPU 311, and various commands and data are written therein and read therefrom. In other words, the CPU 311, the RAM 32, and the ROM 314 configure the control unit of the information processing device 1.

The auxiliary storage device 19 is a nonvolatile storage device, and mainly written therein and read therefrom are information to be retained even when the power of the information processing device 1 is turned OFF; for instance, the operating system (OS) of the information processing device 1 loaded in the RAM 32, various programs for executing the processing described later, and the various data to be used by the information processing device 1. As the auxiliary storage device 19, used may be, for example, an electrically erasable programmable ROM (EEPROM), an hard disk drive (HDD) or the like. Moreover, as the auxiliary storage device 19, a portable medium that can be inserted into and removed from the information processing device 1 can also be used. As examples of portable mediums, there are, for instance, a memory card based on an EEPROM, a compact disc (CD), a digital versatile disc (DVD) and a Blu-ray disc (BD). An auxiliary storage device 19 based on a portable medium and a non-portable auxiliary storage device 19 can also be combined and used.

The touch panel-type display 12 is a display device for displaying images, and is one of the input devices of the information processing device 1. The touch panel-type display 12 may adopt a resistive touch panel or a capacitance type touch panel. In addition, the touch panel-type display 12 may also adopt a touch panel of an arbitrary type.

Figure 3:
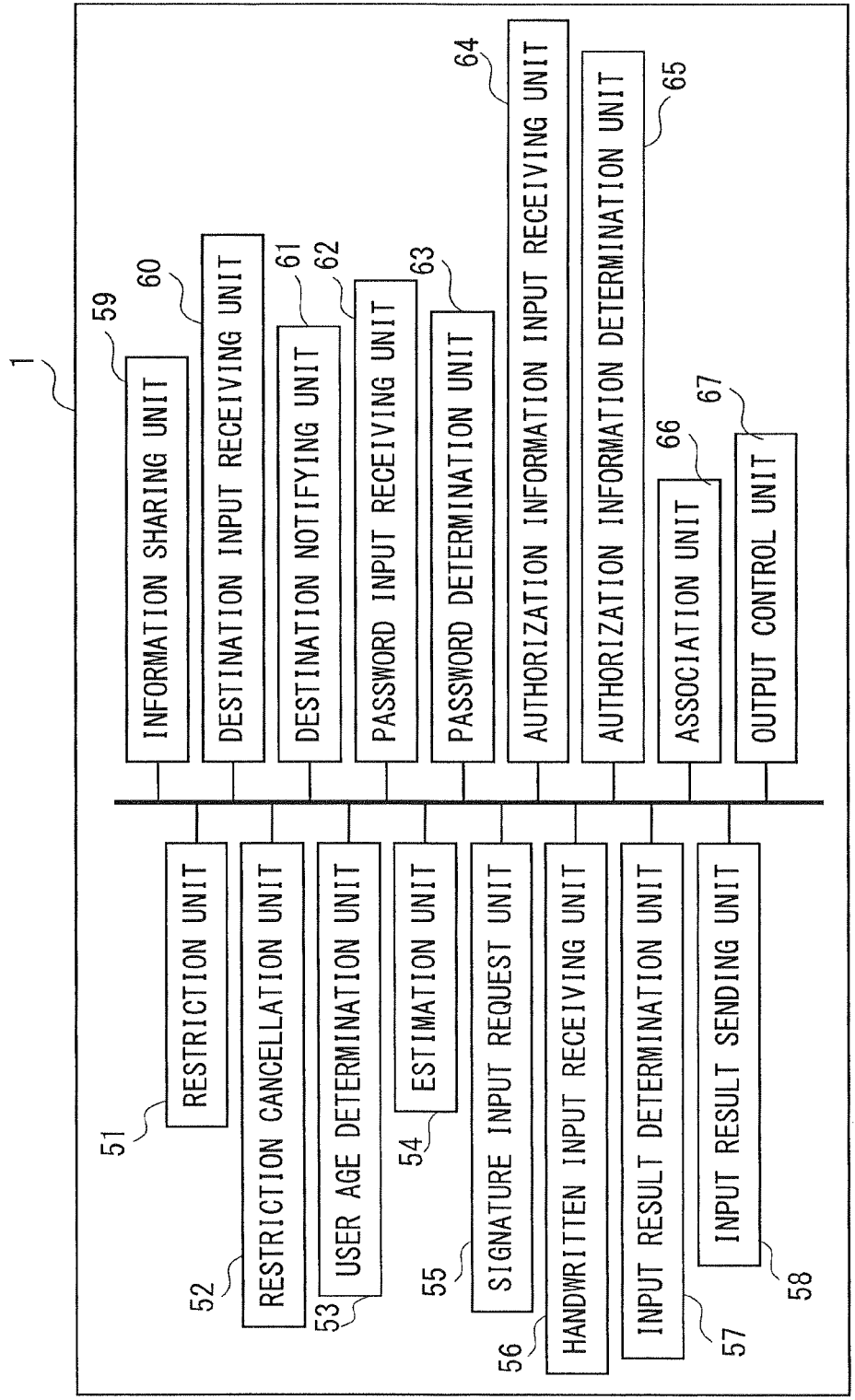
FIG. 3 shows an example of a non-limiting diagram schematically showing the functional configuration of the information processing device.

The functions of the information processing device 1 according to this embodiment are now explained. FIG. 3 is a diagram schematically showing the functional configuration of the information processing device 1 according to this embodiment. The information processing device 1 according to this embodiment functions as the information processing device comprising a restriction unit 51, a restriction cancellation unit 52, a user age determination unit 53, an estimation unit 54, a signature input request unit 55, a handwritten input receiving unit 56, an input result determination unit 57, an input result sending unit 58, an information sharing unit 59, a transmission destination input receiving unit 60, a transmission destination notifying unit 61, a password input receiving unit 62, a password determination unit 63, an authorization information input receiving unit 64, an authorization information determination unit 65, an association unit 66 and an output control unit 67 by the CPU 311 interpreting and executing the various programs stored in the RAM 32. In this embodiment, while a case is explained where each of these functions is executed by a general CPU 311, a part or all of these functions may also be realized by one or more dedicated processors.

The respective operation parts of the information processing device 1 may also be loaded, for example, on a cloud, on the server 3 or the like. Moreover, these operation parts may also be realized by a plurality of types of software, rather than by a single type of software.

The restriction unit 51 restricts the use, by the software, of all or a part of the resources of the information processing device 1. The resources of the information processing device 1 include hardware resources and software resources. Hardware resources are, for example, in addition to the CPU 311, the RAM 32, the ROM 314, the auxiliary storage device 19 and the network interface 36 explained with reference to FIG. 2, various types of hardware that can be mounted on the information processing device 1 such as an imaging device. Moreover, software resources are, for example, the application program interface (API) provided by the information processing device 1, and various types of software such as the modules and the like contained in the target software itself. For example, when the use of the network interface 36 is restricted, the software that is subject to the restriction cannot perform communication. Moreover, when the use of the RAM 32 is restricted, since the software that is subject to the restriction cannot be loaded in the RAM 32, the execution itself is restricted.

For example, as functions in which the restriction thereof can be designated by the administrator, the boot restriction of software that satisfies predetermined conditions, usage restriction of the internet browser, purchase restriction of online products and services, display restriction of 3D images, sending/receiving restriction of still images, moving images, and audio, communication restriction with another information processing device 1, usage restriction of the function for registering another user as a friend, download restriction of software that satisfies predetermined conditions, reception/reproduction restriction of streaming, and so on. In the information processing device 1, these functional restrictions can be realized by performing the usage restriction of the resources based on software.

In this embodiment, there is no limitation in the types of software to be subject to the restriction by the restriction unit 51. In this embodiment, while a case where the application software is executed will be mainly explained, as the software to be subject to the restriction by the restriction unit 51, for instance, in addition to general application software, considered may be game software, service software to be executed in the server 3, MPEG audio layer-3 (MP3) and other audio software, MPEG and other visual software, and so on. In other words, in this embodiment, the execution of software includes the reproduction of audio software, visual software, game software and the like.

The restriction by the restriction unit 51 can be enabled/disabled by the administrator. Since the state of enable/disable of the restriction by the restriction unit 51 is recorded as con figuration information of the information processing device 1 in the auxiliary storage device 19 or the like, in the processing described later, it is possible to confirm whether the restriction by the restriction unit 51 is enabled or disabled by reading and referring to the foregoing configuration information.

Upon the execution of application and the like in the information processing device 1, the restriction cancellation unit 52 cancels the restriction by the restriction unit 51 when the input of the administrator authentication code issued based on the administrator's approval has been received. Here, the administrator authentication code is information showing that the cancellation by the restriction cancellation unit 52 is valid, and is recorded in a recording medium (for example, auxiliary storage device 19) that can be read by the information processing device 1. The medium in which the administrator authentication code is recorded may also be, for example, a medium that is built in the information processing device 1, or a portable medium that can be inserted into and removed from the information processing device 1. In this embodiment, based on the cancellation by the restriction cancellation unit 52, it is possible to cancel the restriction by the restriction unit 51 and use the resource that is being restricted.

The user age determination unit 53 determines whether the user of the information processing device 1 is under a predetermined age. In this embodiment, as a result of determining the user's age, it is possible to determine whether that user is an ideal user for receiving the administrator's approval regarding the use of the function that is subject to usage restriction.

The estimation unit 54 estimates whether the administrator is the user's guardian by determining whether the administrator is at or above a predetermined age. In this embodiment, by determining the administrator's age, it is possible to determine whether that administrator is an ideal administrator for giving one's approval regarding the user's use of the function that is subject to usage restriction.

The signature input request unit 55 requests the input of a handwritten signature by the administrator who was determined to be an ideal administrator for giving one's approval by the estimation unit 54 when the input of the administrator authentication code has not been received upon the execution of the application or the like by the information processing device 1, and the user age determination unit 53 determines that the user's age is under a predetermined age.

The handwritten input receiving unit 56 receives the handwritten input by the administrator or the like via the touch panel-type display 12. The handwritten input received here is the handwritten signature or the like that is input by the administrator. The administrator or the like can perform the handwritten input by touching the screen of the touch panel-type display 12 via a touch pen or one's finger. Note that, while the handwritten input receiving unit 56 according to this embodiment receives the handwritten input via the touch panel-type display 12 of the information processing device 1, it may also receive the handwritten input via an input device (for instance, a tablet or the like) that is connected via a network or the like.

The input result determination unit 57 determines whether the attribute information pertaining to the handwritten input result is within a predetermined range in the handwritten input result that was received by the handwritten input receiving unit 56. A specific example of the determination processing will be described later in the explanation of step S214. In this embodiment, the result of the handwritten input is simply judged by the input result determination unit 57.

The input result sending unit 58 sends, to the server 3, the result of the handwritten input that was input in response to the request from the signature input request unit 55 and which was received by the handwritten input receiving unit 56.

The information sharing unit 59 shares the predetermined information with the server 3 that received the handwritten input result. The information to be shared here is referred to in the determination by the authorization information determination unit 65 described later. Note that, in this embodiment, as the predetermined information, the administrator authentication code is shared by the administrator and the user, in an invisible state between the information processing device 1 and the server 3.

The transmission destination input receiving unit 60 receives the input by the administrator which designates the transmission destination of the administrator authentication code issued by the server 3. Note that, in this embodiment, the transmission destination input receiving unit 60 receives the input which designates an administrator terminal 2 that is different from the information processing device 1 used by the user as the transmission destination of the administrator authentication code.

The transmission destination notifying unit 61 notifies, to the server 3, the transmission destination of the administrator authentication code that was received by the transmission destination input receiving unit 60.

The password input receiving unit 62 receives the input of a personal identification number by the administrator upon the execution of an application or the like in the information processing device 1. Note that, in this embodiment, while a personal identification number is used as the password for authenticating the administrator, the password may also include a character string other than numbers. Moreover, the scheme for authenticating the administrator is not limited to a password. The authentication of the administrator may also be performed, for example, via biometric authentication or other authentication techniques.

The password determination unit 63 determines whether the personal identification number in which the input thereof was received by the password input receiving unit 62 and the personal identification number that was set by the administrator coincide.

The authorization information input receiving unit 64 receives the input based on the administrator's operation of the administrator authentication code issued by the server 3 that received the handwritten input result, and received by the administrator terminal 2 that was designated as the transmission destination. The administrator authentication code is sent from the server 3 by using a communication method (in this embodiment, email communication protocol) that is different from the communication method that enables reception by the information processing device 1. In addition, since the administrator authentication code sent by the server 3 is received by the administrator terminal 2 that is different from the information processing device 1, the administrator will input the administrator authentication code based on input using the information processing device 1. As a result of causing the administrator to intervene in the input of the administrator authentication code, this embodiment inhibits a user from wrongfully acquiring and inputting the administrator authentication code.

The authorization information determination unit 65 determines whether the administrator authentication code in which the input thereof was received by the authorization information input receiving unit 64 is the administrator authentication code that was issued by the server 3. This determination is carried out by comparing the administrator authentication code in which the input thereof was received with the administrator authentication code that was received from the server 3 and which is retained invisibly to the administrator and the user. In other words, in this embodiment, the intervention of the administrator in the approval procedures is ensured by comparing the information that is being shared between the information processing device 1 and the server 3 and the information that is being shared between the server 3 and the administrator terminal 2.

The association unit 66 associates the administrator authentication code in which the input thereof was received by the authorization information input receiving unit 64 with the personal identification number that was set by the administrator. Note that, in this embodiment, a determination method is adopted where the cancellation is determined as enabled when the administrator authentication code is associated with the personal identification number, and the cancellation is determined as disabled when the administrator authentication code is not associated with the personal identification number.

In this embodiment, by comprising this kind of association unit 66, the administrator is not required to input the administrator authentication code each time the restriction cancellation is to be performed, and the restriction cancellation can be performed merely by inputting the personal identification number and, therefore, the operation is simplified. When the administrator authentication code is set, regardless of which application or the like is executed subsequently, the cancellation by the restriction cancellation unit 52 is performed only with the input of the personal identification number upon using the function that is subject to usage restriction. In this embodiment, by setting the administrator authentication code and enabling the use thereof from any application or the like, the cancellation by the restriction cancellation unit 52 is caused to be ongoing with respect to all applications or the like that are executed in the information processing device 1. Note that, in this embodiment, "setting the administrator authentication code" refers to the administrator authentication code, which was sent from the server 3 to the administrator terminal 2, being input in the information processing device 1, and associated with the personal identification number.

The output control unit 67 outputs and display, to and on the touch panel-type display 12, the message or the like notified to the user in the administrator approval-related processing described later.

<Flow of Processing>

The flow of processing to be executed in this embodiment is now explained. Note that the specific processing contents and processing order shown in the flowcharts pertaining to this embodiment are merely examples for implementing the present disclosure. The specific processing contents and processing order may be selected as needed according to the embodiments of the present disclosure.

FIG. 4 to FIG. 7 are flowcharts of the administrator approval-related processing according to this embodiment. The administrator approval-related processing shown in these flowcharts is executed when a predetermined function that could be subject to the usage restriction by the restriction unit 51 is called upon the execution of an application or the like in the information processing device 1. Note that, while the respective steps explained below are realized by the software (for instance, OS of the information processing device 1 or security software installed in the information processing device 1) recorded in the medium built in the information processing device 1, certain steps among these steps may also be realized by executing the software that the subject of restriction by the restriction unit 51.

Figure 4:
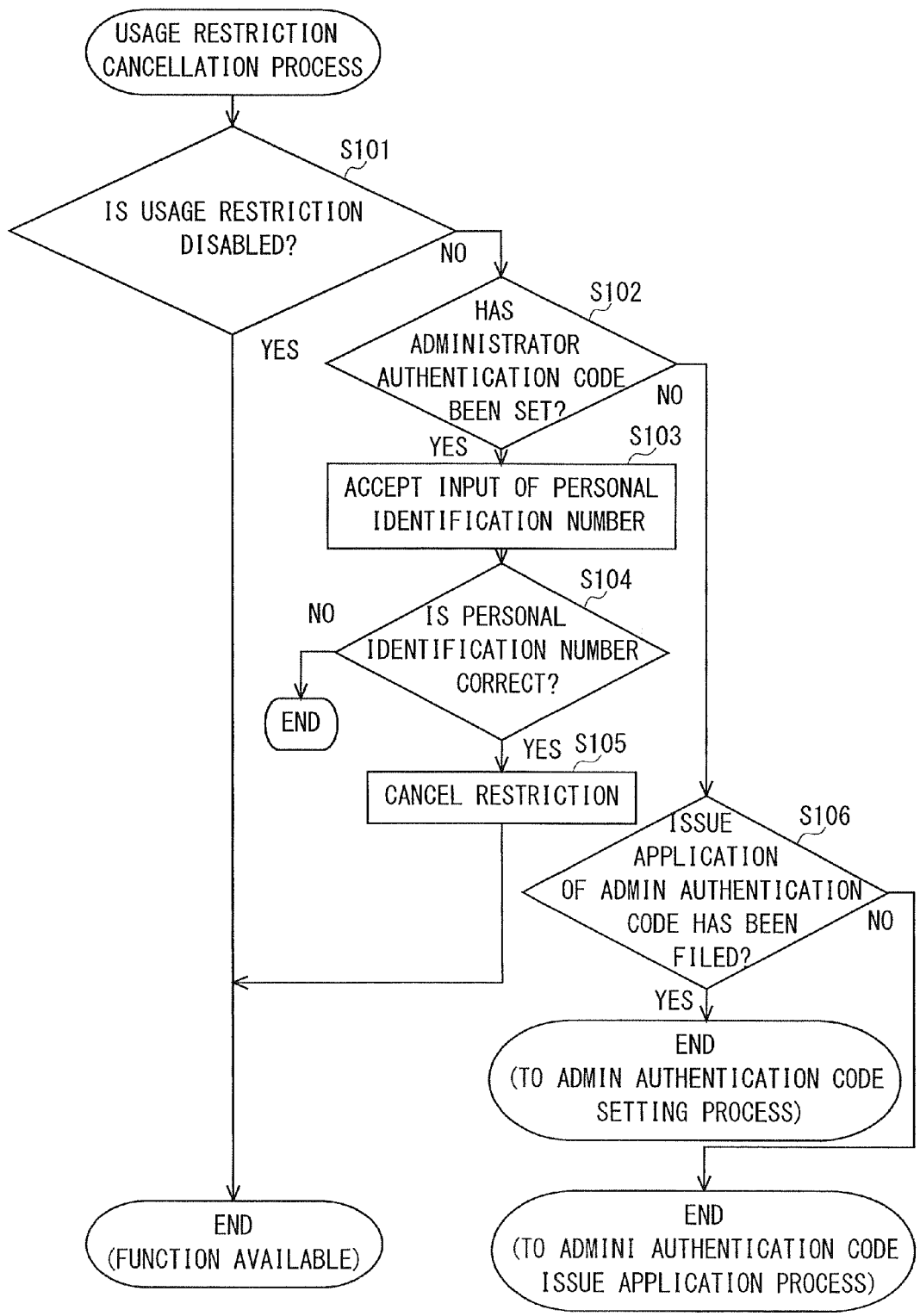
FIG. 4 shows an example of a non-limiting flow of the usage restriction cancellation process.

Foremost, with reference to FIG. 4, the flow of processing pertaining to the cancellation of the usage restriction by the restriction unit 51 within the administrator approval-related processing according to this embodiment is now explained.

In step S101, whether the usage restriction of a predetermined function of the information processing device 1 is of a disabled setting is determined. The control unit of the information processing device 1 determines whether the usage restriction of a predetermined function of the information processing device 1 is of a disabled setting by referring to a flag or the like, which shows whether the usage restriction of the predetermined function is enabled or disabled, recorded in the auxiliary storage device 19.

When it is determined that the usage restriction of a predetermined function of the information processing device 1 is of a disabled setting, the processing shown in this flowchart is ended. Here, since the usage restriction of a predetermined function of the information processing device 1 is of a disabled setting, the usage restriction of the predetermined function by the restriction unit 51 is not performed. Thus, the user can execute the application or the like without any functional restriction.

Meanwhile, when the usage restriction of a predetermined function of the information processing device 1 is not of a disabled setting (when it is of an enabled setting or not yet set), the processing proceeds to step S102.

In step S102, whether the administrator authentication code has been set is determined. The control unit of the information processing device 1 determines whether administrator authentication code has been set is by determining whether the setting where the usage restriction of the predetermined function will be cancelled by inputting the personal identification number is retained in the auxiliary storage device 19. However, the determination of whether the administrator authentication code has been set may also be performed by referring to a flag or the like that is operated when the administrator authentication code is set. When it is determined that the administrator authentication code has been set, the processing proceeds to step S103. Meanwhile, when it is determined that the administrator authentication code has not been set, the processing proceeds to step S106.

In step S103 to step S105, the usage restriction of a predetermined function is cancelled based on the input of the personal identification number. The output control unit 67 outputs, to the touch panel-type display 12, a message urging the administrator to input the personal identification number, and a software keyboard for allowing the administrator to input the personal identification number that was pre-set in the information processing device 1. The administrator inputs the personal identification number based on the operation of touching a predetermined region of the touch panel-type display 12 to which the software keyboard was output, the operation or selecting the predetermined key of the software keyboard by using another input device (button or the like), or other operations. Note that, also in the other steps explained below, similar methods may be adopted as the input operation to be performed by the user or the administrator (excluding the handwritten input operation). The password input receiving unit 62 receives the personal identification number that was input by the administrator (step S103).

When the personal identification number is received, the password determination unit 63 determines whether the received personal identification number and the personal identification number pre-set in the information processing device 1 coincide (step S104). When the received personal identification number does not coincide with the pre-set personal identification number, the processing shown in this flowchart is ended. Note that, when the personal identification numbers do not coincide, rather than immediately ending the processing, it is also possible to retry the input of the personal identification number to a predetermined number of times as the upper limit. When the retry count of the input of the personal identification number reaches the predetermined number of times, an error display is output by the output control unit 67, and the processing shown in this flowchart is ended. When the personal identification numbers do not coincide, the usage restriction of the predetermined function is not cancelled. Meanwhile, when the received personal identification number coincides with the pre-set personal identification number, the restriction cancellation unit 52 cancels the usage restriction of the predetermined function by the restriction unit 51 (step S105). The processing shown in this flowchart is thereafter ended, and the application or the like is executed. Since the usage restriction of the predetermined function by the restriction unit 51 is cancelled, the user can thereafter execute the application or the like without any functional restriction.

Here, the restriction cancellation unit 52 allows the application or the like to use the predetermined resource of the information processing device 1 by cancelling (ignoring) the restriction by the restriction unit 51 regarding the resource that is subject to cancellation. For example, the application or the like can communicate with another information processing device 1 by using a wireless communication module 36 or a local communication module 37, which is a communication resource provided to the information processing device 1.

In step S106, whether the issue application of the administrator authentication code has been performed is determined. Here, the issue application of the administrator authentication code is the process of requesting the server 3 to issue the administrator authentication code by sending the administrator information to the server 3. In this embodiment, while the information sharing unit 59 receives the administration authentication code from the server 3 immediately after the issue application of the administrator authentication code (refer to step S217 described later) and retains the administrator authentication code in the auxiliary storage device 19, such administrator authentication code is retained in an invisible state from the user and the administrator. Thus, in this embodiment, the control unit of the information processing device 1 determines whether the issue application of the administrator authentication code has been performed by determining whether the administrator authentication code, which was sent from the server 3 to the information processing device 1, is retained in the auxiliary storage device 19 in an invisible state from the user and the administrator. However, whether the issue application of the administrator authentication code has been performed can also be determined by using a flag that is set based on the issue application of the administrator authentication code.

Figure 6:
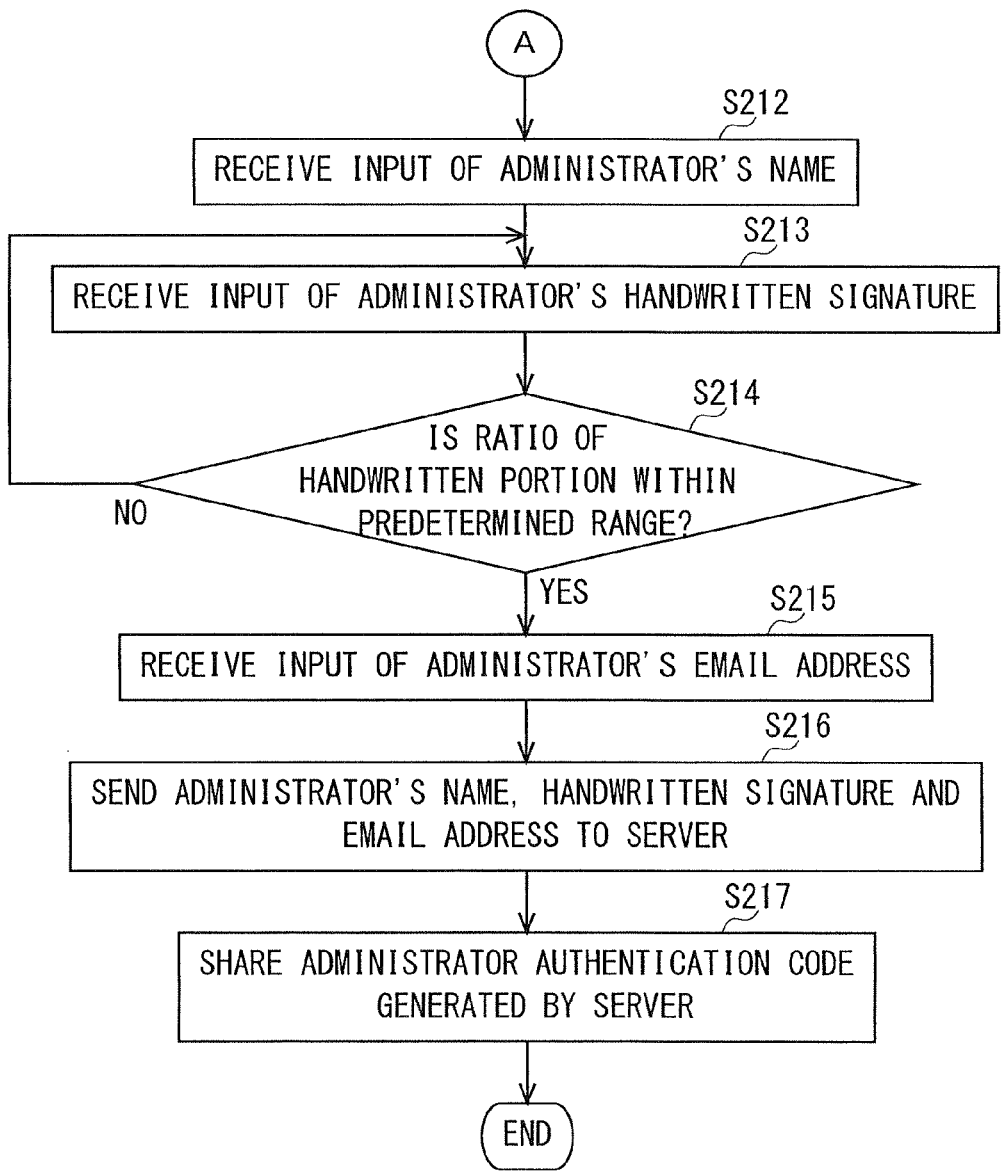
FIG. 6 shows an example of a non-limiting flow (2) of the administrator authentication code issue application process.
Figure 7:
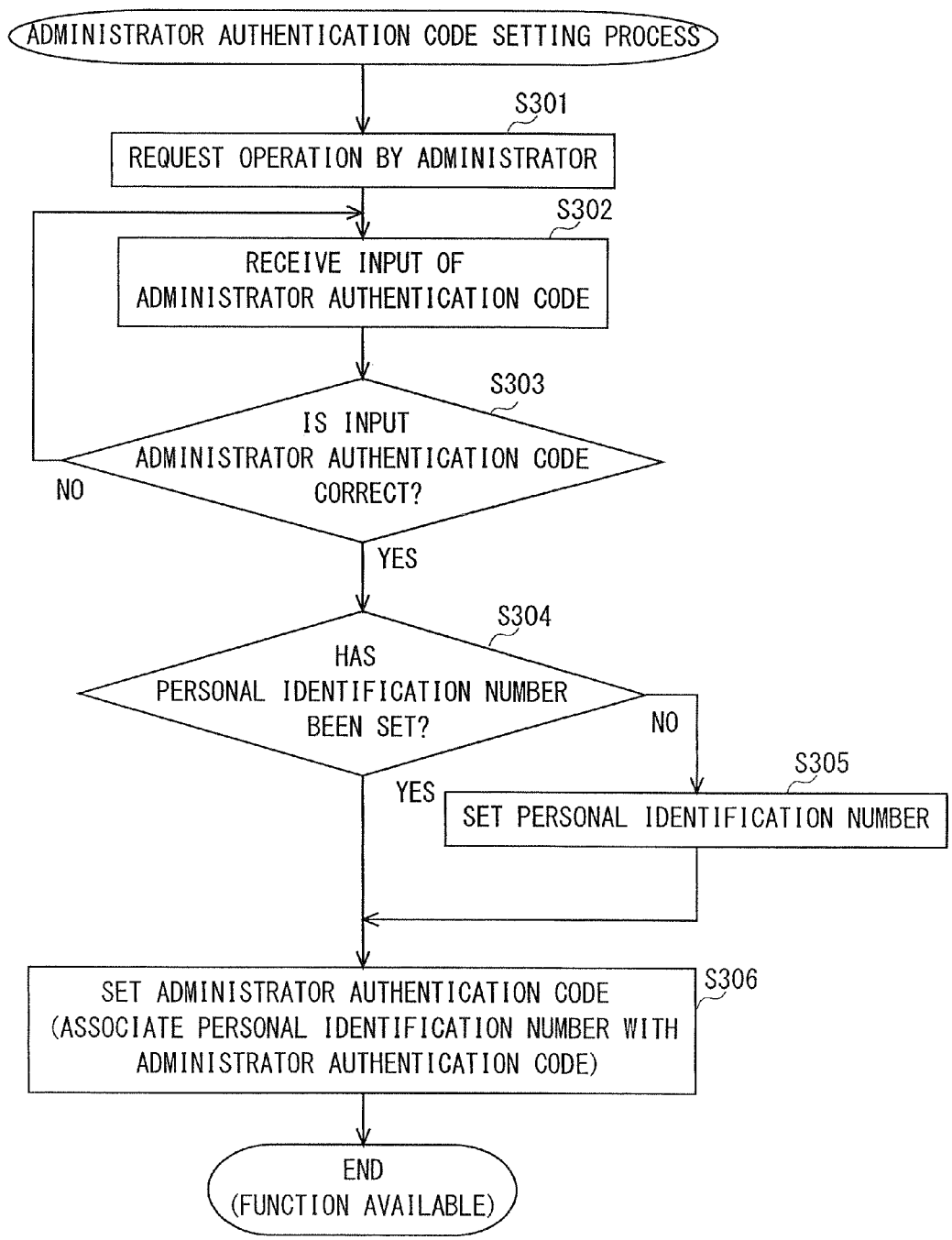
FIG. 7 shows an example of a non-limiting flow of the administrator authentication code setting process.

When it is determined that the issue application of the administrator authentication code as been performed, the processing proceeds to the administrator authentication code setting process shown in FIG. 7 in order to set the issued administrator authentication code. Meanwhile, when it is determined that the issue application of the administrator authentication code has not been performed, the processing proceeds to the administrator authentication code issue application shown in FIG. 5 and FIG. 6 in order to perform the issue application of the administrator authentication code.

Figure 5:
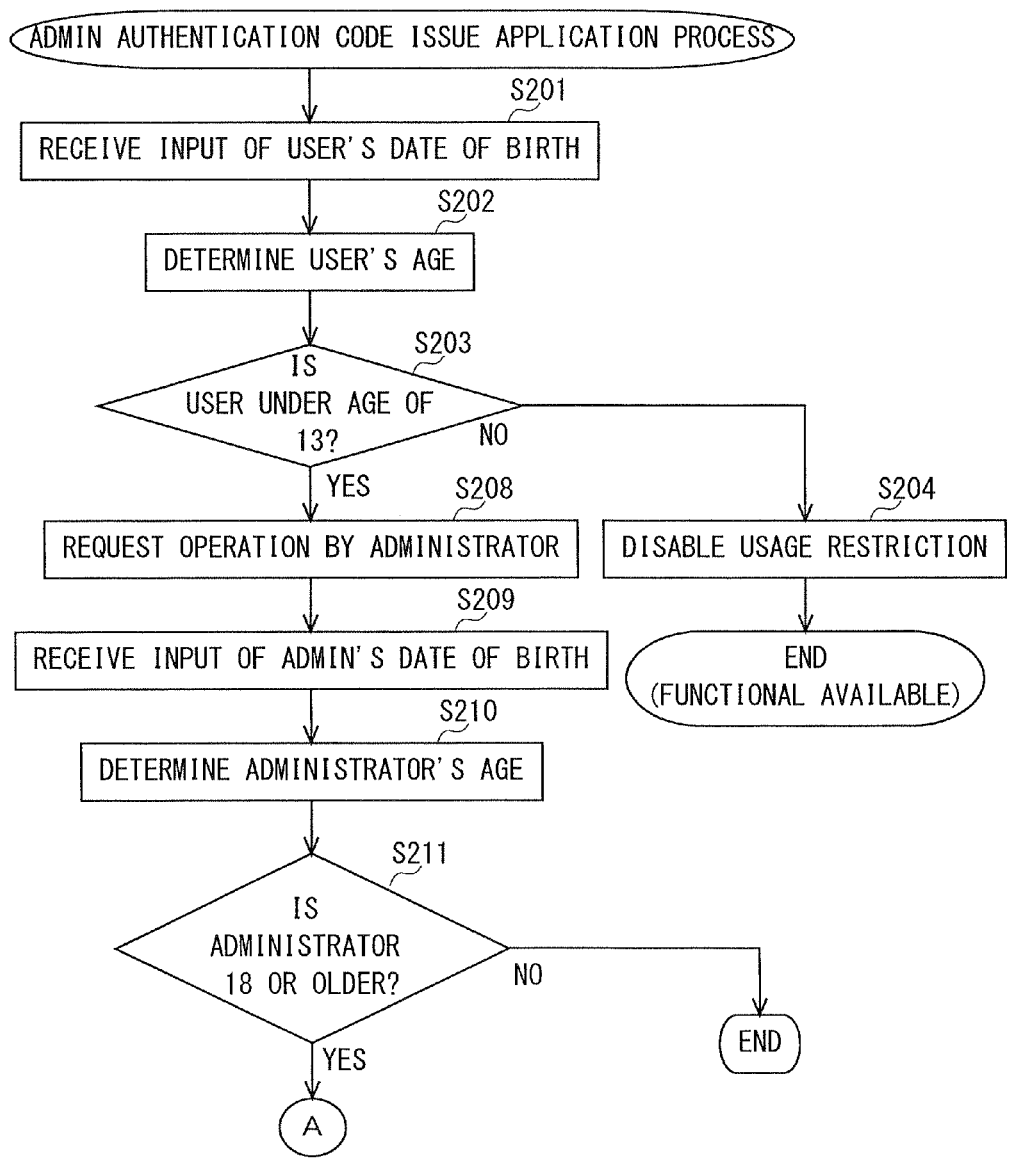
FIG. 5 shows an example of a non-limiting flow (1) of the administrator authentication code issue application process.

The flow of the processing pertaining to the issue application of the administrator authentication code within the administrator approval-related processing according to this embodiment is now explained with reference to FIG. 5 and FIG. 6. The processing shown in these flowcharts is executed when it is determined in step S106 that the issue application of the administrator authentication code has not been performed.

In step S201, a message for urging the user to input one's date of birth is output, and the input of the user's date of birth is received. The output control unit 67 urges the user to input one's date of birth by outputting, to the touch panel-type display 12, a message urging the user to input one's date of birth and a software keyboard. Subsequently, the control unit of the information processing device 1 receives the user's date of birth that was input by the user by using the software keyboard or the like. The processing thereafter proceeds to step S202.

In step S202 and step S203, whether the user using the information processing device 1 is a user who needs to obtain the administrator's approval for cancelling the restriction by the restriction unit 51. In this embodiment, whether the administrator's approval is required is determined based on the user's age. For example, it is determined that the administrator's approval is required when the user is under the age of 13, and determined that the administrator's approval is not required when the user is 13 year old or older.

More specifically, the user age determination unit 53 sends, to the server 3, the user's date of birth that was received in step S201. Subsequently, the server 3 that received the user's date of birth calculates the user's age based on the received date of birth and the current date and time, and compares the calculated user's age with the reference age for determining whether the approval is required. When the calculated user's age is less than the reference age (in this embodiment, age of 13), the server 3 notifies the information processing device 1 that the user is a user who needs to obtain the administrator's approval. Meanwhile, when the calculated user's age is equal to or over the reference age, the server 3 notifies the information processing device 1 that the user is a user who does not need to obtain the administrator's approval. The user age determination unit 53 receives the notice from the server 3 (step S202) and, in accordance with the contents of the notice, determines whether the user using the information processing device 1 is a user who needs to obtain the administrator's approval upon cancelling the restriction by the restriction unit 51 (step S203). When it is determined that the user is a user who needs to obtain the administrator's approval, the processing proceeds to step S208. Meanwhile, when it is determined that the user is a user who does not need to obtain the administrator's approval, the processing proceeds to step S204.

In step S204, the usage restriction of a predetermined function of the restriction unit 51 is subject to a disabled setting. The control unit of the information processing device 1 performs the disabled setting of the usage restriction by setting a flag, which shows the enable or disable of the usage restriction of the predetermined function, stored in the auxiliary storage device 19 to a value showing that the usage restriction is disabled (not subject to usage restriction). The processing shown in this flowchart is thereafter ended. Here, since the usage restriction of the predetermined function of the information processing device 1 is of a disabled setting as a result of the processing shown in step S204, the usage restriction of the predetermined function by the restriction unit 51 is not performed. Thus, the user can thereafter execute the application or the like without any functional restriction.

In step S208, a message requesting the administrator's operation is output. The output control unit 67 urges the administrator's operation by outputting, to the touch panel-type display 12, a message requesting that the operation related to the subsequent processing be switched from the user to the administrator. The processing thereafter proceeds to step S209.

In step S209, a message urging the administrator to input one's date of birth is output, and the input of the administrator's date of birth is received. The output control unit 67 urges the administrator, who took over the operation upon receiving the message displayed in step S208, to input one's date of birth by outputting, to the touch panel-type display 12, a message urging the administrator to input one's date of birth and a software keyboard. Subsequently, the control unit of the information processing device 1 receives the administrator's date of birth that was input by the administrator by using the software keyboard or the like. The processing thereafter proceeds to step S210.

In step S210 and step S211, whether the administrator of the information processing device 1 is a qualified administrator is estimated. In other words, in an embodiment where the user is a child and the administrator is a guardian of that child, it is estimated whether the administrator is a qualified administrator as the guardian of that user. In this embodiment, whether the administrator is a qualified administrator is estimated based on the administrator's age. For example, it is estimated that the administrator is a qualified administrator when his/her age is equal to or over 18, and estimated that the administrator is not a qualified administrator when his/her age is under 18.

More specifically, the estimation unit 54 sends, to the server 3, the administrator's date of birth received in step S209. Subsequently, the server 3 that received the administrator's date of birth calculates the administrator's age based on the received date of birth and the current date and time, and compares the calculated administrator's age with the reference age for determining whether the administrator is a qualified administrator. When the calculated administrator's age is equal to or over the reference age (in this embodiment, age of 18), the server 3 notifies the information processing device 1 that the administrator is a qualified administrator. Meanwhile, when the calculated administrator's age is under the reference age, the server 3 notifies the information processing device 1 that the administrator is not a qualified administrator. The estimation unit 54 receives the notice from the server 3 (step S210) and, in accordance with the contents of the notice, determines whether the administrator of the information processing device 1 is a qualified administrator as the guardian of the user (step S211). When it is determined that the administrator is a qualified administrator, the processing proceeds to step S212. Meanwhile, when it is determined that the administrator is not a qualified administrator, the processing shown in this flowchart is ended. In the foregoing case, the usage restriction of the predetermined function is not cancelled.

The processing shown in step S212 to step S216 is the processing for acquiring the administrator information including the administrator's name, handwritten signature and email address, and sending the administrator information to the server 3.

In step S212, a message urging the administrator to input one's name is output, and the input of the administrator's name is received. The output control unit 67 urges the administrator to input one's name by outputting, to the touch panel-type display 12, a message urging the administrator to input one's name and a software keyboard. Subsequently, the control unit of the information processing device 1 receives the administrator's name that was input by the administrator by using the software keyboard or the like. The processing thereafter proceeds to step S213.

In step S213, a message urging the administrator to input one's handwritten signature (autograph) is output, and the input of the administrator's handwritten signature is received. The signature input request unit 55 urges the administrator to input one's handwritten signature by outputting, to the touch panel-type display 12, a message urging the administrator to input one's handwritten signature and a handwriting input column to be used by the administrator for inputting one's handwritten signature. The administrator inputs one's handwritten signature by performing a touch operation on a region of the handwriting input column displayed on the touch panel-type display 12. The handwritten input receiving unit 56 receives the administrator's handwritten signature that was input. The processing thereafter proceeds to step S214.

In step S214, a simple judgment of the administrator's handwritten signature is performed. The input result determination unit 57 performs the simple judgment of the administrator's handwritten signature by determining whether the attribute information pertaining to the handwritten input result is within a predetermined range in the handwritten input result received in step S214. When it is determined that the attribute information pertaining to the handwritten input result is not within the predetermined range, the processing proceeds to step S213. In other words, in the processing shown in this flowchart, the processing shown in step S213 and step S214 is repeatedly executed until the handwritten signature that passes the simple judgment is input. Meanwhile, when it is determined that the attribute information pertaining to the handwritten input result is within the predetermined range, the processing proceeds to step S215.

The input result determination unit 57 can perform the simple judgment of the administrator's handwritten signature by determining whether the ratio of the handwritten portion relative to the region of the handwriting input column, which is the handwritable area, is within a predetermined range. When the handwritten input result is acquired as a binary bitmap of white and black where the background region is white and the handwritten portion is black, the input result determination unit 57 calculates the ratio of black pixels in the region of the handwriting input column (among all pixels contained in the bitmap), and determines whether this ratio is within a predetermined range (for example, 5% or more and 95% or less).

Moreover, the input result determination unit 57 can also perform the simple judgment, for example, by determining whether the length of the track of the handwritten signature is within a predetermined range, or determining whether the time that the touch panel-type display 12 was being touched during the input of the handwritten signature is within a predetermined range. In addition, the input result determination unit 57 can also perform the simple judgment by comparing various types of attribute information pertaining to the handwritten input result with a predetermined threshold.

In step S215, a message urging the administrator to input one's email address is output, and the input of the administrator's email address is received. The output control unit 67 urges the administrator to input one's email address by outputting, to the touch panel-type display 12, a message urging the administrator to input one's email address and a software keyboard. Subsequently, the transmission destination input receiving unit 60 receives the administrator's email address that was input by the administrator by using the software keyboard or the like. The processing thereafter proceeds to step S216.

Note that the email address that is input here is an email address which allows the reception of emails with the administrator terminal 2. In this embodiment, the information processing device 1 does not comprise an email receiving function. Thus, the administrator inputs an email address which allows the reception of emails with the administrator terminal 2, which is a terminal that is different from the information processing device 1. As a result of adopting the foregoing configuration, it is possible to urge the administrator to input the administrator authentication code while inhibiting the user from posing as the administrator and wrongfully receiving and inputting the administrator authentication code by using the information processing device 1.

In step S216, the administrator's name, handwritten signature and email address are sent to the server 3. The transmission destination notifying unit 61 includes, in the administrator information, the administrator's email address that was received in step S215. The administrator information includes the administrator's name acquired in step S212, the administrator's handwritten signature acquired in step S213, and the administrator's email address acquired in step S215, and the input result sending unit 58 sends the administrator information containing the foregoing information to the server 3 via a network. The processing thereafter proceeds to step S217. However, the administrator's name, handwritten signature and email address may also be individually sent to the server 3.

The administrator information sent in step S216 is received by the server 3. Here, the processing that is executed by the server 3 that received the administrator information is explained. The server 3 acquires the administrator's name, handwritten signature and email address from the received administrator information, and retains such information in the administrator information database 4. Subsequently, the server 3 generates a unique administrator authentication code for that administrator, and sends the generated administrator authentication code to the information processing device 1. The sending of the administrator authentication code in this case is performed for the internal sharing of information (which is invisible to the administrator and the user) between the server 3 and the information processing device 1 performed by the information sharing unit 59, and is different from the issue of the administrator authentication code to the administrator. In this embodiment, the administrator authentication code is addressed and sent to the administrator terminal 2 by using a separate email protocol.

In step S217, the administrator authentication code generated by the server 3 is shared. When the information sharing unit 59 receives the administrator authentication code sent by the server 3, it shares the administrator authentication code between the information processing device 1 and the server 3 by retaining the received administrator authentication code in a manner that is invisible to both the user and the administrator. Here, an invisible state to the user and the administrator refers to a state where the administrator authentication code is retained in a state of not being output to the touch panel-type display 12 or the like even based on an operation by the user or the administrator.

As a method of retaining the administrator authentication code in an invisible state to the user and the administrator, various methods may be adopted; for instance, a method of retaining the administrator authentication code in a region of the auxiliary storage device 19 that cannot be perused based on the operation of the user or the administrator, or the method of encrypting the administrator authentication code and converting it into a hash value. As a result of invisibly retaining the received administrator authentication code, when the administrator inputs the administrator authentication code received by the administrator terminal 2, it is possible to compare the administrator authentication code that was input by the administrator and the administrator authentication code that is being retained invisibly, and determine whether the input administrator authentication code is correct. The processing shown in this flowchart is thereafter ended.

In addition, the server 3 includes the generated administrator authentication code in the text of an email and sends the email to the administrator terminal 2. In this embodiment, the handwritten signature acquired in the server 3 is confirmed by a manager. When the manager who confirmed the handwritten signature issues a command to the server 3 to the effect that the administrator authentication code may be issued, the server 3 includes the generated administrator authentication code in the text of an email and sends the email to the administrator terminal 2. However, the administrator authentication code may also be confirmed and issued based on methods other than via confirmation by the manager. For example, the server 3 may also determine the authenticity or appropriateness of the signature by analyzing the image of the administrator's handwritten signature that was received. Upon analyzing the handwritten signature, a command to the effect that the administrator authentication code may be issued is input to the server 3 only when the analysis was favorable.

Since the email address to become the address of the email containing the administrator authentication code is the email address which allows the administrator terminal 2 to receive emails, the administrator can peruse the email sent from the server 3 and the administrator authentication code contained in the email by operating the administrator terminal 2. In this embodiment, since a terminal other than the information processing device 1 is used as the administrator terminal 2, a user (for example, a child) other than the administrator cannot peruse the administrator authentication code.

The flow of processing for setting the within the administrator approval-related processing according to this embodiment is now explained with reference to FIG. 7. The processing shown in this flowchart is executed when it is determined, in step S106, that the issue application of the administrator authentication code has been performed (refer to FIG. 4).

In step S301, a message requesting the administrator to perform an operation is output. The output control unit 67 urges the administrator's operation by outputting, to the touch panel-type display 12, a message requesting that the operation related to the subsequent processing be switched from the user to the administrator. The processing thereafter proceeds to step S302.

In step S302, a message urging the administrator to input the administrator authentication code is output, and the input of the administrator authentication code is received. The output control unit 67 urges the administrator to input the administrator authentication code by outputting, to the touch panel-type display 12, a message requesting the administrator to input the administrator authentication code and a software keyboard. The administrator peruses the administrator authentication code sent from the server 3 in the administrator terminal 2, and inputs the administrator authentication code to the information processing device 1 by using the software keyboard. Subsequently, the authorization information input receiving unit 64 receives the administrator authentication code that was input by the administrator. The processing thereafter proceeds to step S303.

In step S303, it is determined whether the input administrator authentication code is correct. The authorization information determination unit 65 determines whether the administrator authentication code, in which the input thereof was received in step S302, was received in step S217, and coincides with the administrator authentication code retained invisibly by the auxiliary storage device 19. As a result of performing this kind of determination, it is possible to determine whether the input administrator authentication code is correct. When it is determined that the input administrator authentication code is not correct, the processing proceeds to step S302. In other words, in the processing shown in this flowchart, the processing shown in step S302 and step S303 is repeatedly executed until the correct administrator authentication code is input by the administrator. Meanwhile, when it is determined that the input administrator authentication code is correct, the processing proceeds to S304.

In step S304, the information processing device 1 determines whether the personal identification number has been set. The control unit of the information processing device 1 determines whether the personal identification number has been set by referring the configuration information of the information processing device 1 retained in the auxiliary storage device 19 or the like. When it is determined that the personal identification number has been set, the processing proceeds to step S306. When it is determined that the personal identification number has not yet been set, the processing proceeds to step S305.

In step S305, the personal identification number is set. The output control unit 67 urges the administrator to input one's desired personal identification number by outputting, to the touch panel-type display 12, a request for the administrator to input one's desired personal identification number and a software keyboard. The administrator uses the software keyboard and inputs the personal identification number. Subsequently, the control unit of the information processing device 1 receives the personal identification number that was input by the administrator, and stores such personal identification number in the configuration information of the information processing device 1. When the setting of the personal identification number is complete, the processing proceeds to step S306.

In step S306, the administrator authentication code is set. The association unit 66 associates the personal identification number set in the information processing device 1 with the administrator authentication code input in step S302. Subsequently, the control unit of the information processing device 1 changes the configuration information so that the usage restriction of a predetermined function will be cancelled when the personal identification number is input as a result of configuring a setting where the usage restriction of the predetermined function, which is subject to the restriction by the restriction unit 51, is included in the restrictions that can be cancelled using the personal identification number recorded in the auxiliary storage device 19. The processing shown in this flowchart is thereafter ended.

Based on the processing shown in this flowchart, the setting of the administrator authentication code is completed, and the user or the administrator can subsequently cancel the usage restriction by the restriction unit 51 by only inputting the personal identification number without having to input the administrator authentication code.

<Variation of Embodiment>

A variation that can be applied to the foregoing embodiment is now explained.

(Variation of Information Sharing)

In the foregoing embodiment, the information sharing unit 59 shares predetermined information with the server 3 that received the handwritten input result by receiving, from the server 3, the administrator authentication code after the issue application of the administrator authentication code, and retaining the administrator authentication code in the auxiliary storage device 19 in an invisible state from the user and the administrator. However, other methods may be adopted as the specific method for sharing information.

For example, the information sharing unit 59 shares information by sending, together with the issue application of the administrator authentication code, predetermined information (for example, serial number or the like of the information processing device 1) to the server 3. In addition, when the administrator authentication code is input by the administrator, the authorization information determination unit 65 determines whether the input administrator authentication code is correct by determining whether the input administrator authentication code was generated by using the predetermined information.

Moreover, the information sharing unit 59 shares information by receiving, from the server 3, and retaining a hash value of the administrator authentication code after the issue application of the administrator authentication code. In addition, when the administrator authentication code is input by the administrator, the authorization information determination unit 65 determines whether the input administrator authentication code is correct by generating a hash value of the input administrator authentication code and comparing it with the hash value that was received in advance. In the foregoing case, even if the hash value is perused by the user or the like, since it is difficult to guess the administrator authentication code from the perused information, it is possible to inhibit the input of a wrongful administrator authentication code.

(Information Processor Used by Multiple Users)

Moreover, when the information processing device 1 is an information processing device where a plurality of different users can log in and use the same, the setting of the usage restriction by the restriction unit, the issue application of the administrator authentication code and the setting of the administrator authentication code explained in the foregoing embodiment may also be managed for each user who is set in the information processing device 1.

For example, various types of information pertaining to the usage restriction enable/disabled setting, recording of the issue application status of the administrator authentication code (in the foregoing embodiment, internal retention of the administrator authentication code), setting of the administrator authentication code and the like is managed by being associated with the identifying information of the user for each user who is registered in the information processing device 1. In addition, the control unit of the information processing device 1 acquires, in the processing shown in the flowcharts, the identifying information of the user or users who are currently logged into the information processing device 1 from the information processing device 1, and uses the various types of information associated with the acquired user indentifying information so as to use the administrator approval system for each user who is using the information processing device 1.

<Effect>

According to the information processing device 1 of this embodiment, the procedures for acquiring the administrator's approval can be efficiently performed by using the function that is subject to restriction by the restriction unit. Moreover, according to the information processing device 1 of this embodiment, the burden of developing applications and the like can be alleviated since the usage restriction of the respective applications and the like being executed in the information processing device 1 can be cancelled based on the approval acquisition scheme equipped by the information processing device 1.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable medium having recorded thereon an information processing program for causing a computer of an information processing device having a restriction unit for restricting use of functions of the information processing device and a handwritten input receiving unit to function as:
   a signature input request unit for requesting an input of a handwritten signature;
   an input result sending unit for sending, to a server, a result of a handwritten input which has been input in response to the request from the signature input request unit and received by the handwritten input receiving unit;
   an authorization information input receiving unit for receiving an input of authorization information issued by the server that has received transmission of the result of the handwritten input and which shows that the use of the functions of the information processing device is authorized;
   a receiving unit for receiving the authorization information from the server;
   a determining unit for determining whether the input authorization information, the input of which has been received by the authorization information input receiving unit, coincides with the received authorization information received by the receiving unit; and
   a restriction cancellation unit for cancelling the restriction by the restriction unit,
   wherein the restriction cancellation unit cancels the restriction by the restriction unit when the determining unit determines that the input authorization information and received authorization information coincide.

2. The non-transitory computer-readable medium having recorded thereon an information processing program according to claim 1,
   wherein the signature input request unit requests the input of the handwritten signature when the input of the authorization information has not been received upon executing software operation in the information processing device, and
   wherein the restriction cancellation unit cancels the restriction by the restriction unit when the input of the authorization information has been received upon executing software operation in the information processing device.

3. The non-transitory computer-readable medium having recorded thereon an information processing program according to claim 1,
   wherein the restriction unit impose restriction of the use of the function on a user of the information processing device, and
   wherein the signature input request unit requests an input of the handwritten signature by an administrator of the user who is different from the user.

4. The non-transitory computer-readable medium having recorded thereon an information processing program according to claim 3 which causes the computer to function further as:
   a transmission destination input receiving unit for receiving from the administrator an input which designates a transmission destination of the authorization information issued by the server; and
   a transmission destination notifying unit for notifying the server of the transmission destination of the authorization information received by the transmission destination input receiving unit,
   wherein the authorization information input receiving unit receives the input of the authorization information issued by the server and received by a terminal designated as the transmission destination.

5. The non-transitory computer-readable medium having recorded thereon an information processing program according to claim 4,
   wherein the transmission destination input receiving unit receives an input which designates a terminal that is different from the information processing device used by the user as the transmission destination of the authorization information.

6. The non-transitory computer-readable medium having recorded thereon an information processing program according to claim 5,
   wherein the transmission destination input receiving unit receives an input which designates an email address of emails to be received by a terminal that is different from the information processing device used by the user as the transmission destination of the authorization information.

7. The non-transitory computer-readable medium having recorded thereon an information processing program according to claim 3,
   wherein the authorization information input receiving unit receives an input of the authorization information based on an operation by the administrator.

8. The non-transitory computer-readable medium having recorded thereon an information processing program according to claim 3 which causes the computer to function further as:
   an association unit for associating the authorization information, the input of which has been received by the authorization information input receiving unit, with a password set by the administrator;
   a password input receiving unit for receiving an input of the password set by the administrator upon executing software operation in the information processing device; and
   a password determination unit for determining whether the input password, the input of which has been received by the password input receiving unit, coincides with the set password set by the administrator, wherein the restriction cancellation unit cancels the restriction by the restriction unit when the password determination unit determines that the input password and the set password coincide.

9. The non-transitory computer-readable medium having recorded thereon an information processing program according to claim 3, which causes the computer to function further as:
   a user age determination unit for determining whether the user of the information processing device is under a predetermined age,
   wherein the signature input request unit requests an input of the handwritten signature by the administrator when the user age determination unit determines that the age of the user is under the predetermined age.

10. The non-transitory computer-readable medium having recorded thereon an information processing program according to claim 3, which causes the computer to function further as:
    an estimation unit for estimating whether the administrator is a guardian of the user by determining whether the administrator is at or above a predetermined age,
    wherein the input result sending unit sends the result of the handwritten input to the server when the estimation unit estimates that the administrator is the guardian of the user.

11. The non-transitory computer-readable medium having recorded thereon an information processing program according to claim 3,
    wherein the authorization information is sent from the server by using a communication method that is different from a communication method which enables reception of the authorization information by the information processing device.

12. The non-transitory computer-readable medium having recorded thereon an information processing program according to claim 1, which causes the computer to function further as:
    an information sharing unit for sharing predetermining information with the server that has received the result of the handwritten input; and
    an authorization information determination unit for determining whether the authorization information, the input of which has been received by the authorization information input receiving unit, has been issued by the server by using the predetermined information,
    wherein the restriction cancellation unit cancels the restriction by the restriction unit when the authorization information determination unit determines that the authorization information, the input of which has been received, has been issued by the server.

13. The non-transitory computer-readable medium having recorded thereon an information processing program according to claim 1, which causes the computer to function further as:
    an input result determination unit for determining whether attribute information pertaining to the handwritten input result satisfies predetermined conditions in the handwritten input result received by the handwritten input receiving unit,
    wherein the input result sending unit sends the handwritten input result to the server when the input result determination unit determines that the attribute information satisfies the predetermined conditions.

14. The non-transitory computer-readable medium having recorded thereon an information processing program according to claim 13,
    wherein the input result determination unit determines whether a ratio of a handwritten portion relative to a handwritable area is within a predetermined range in the handwritten input result that was received by the handwritten input receiving unit, and
    wherein the input result sending unit sends the handwritten input result to the server when the input result determination unit determines that the ratio of the handwritten portion relative to the handwritable area is within the predetermined range.

15. An information processing device, comprising:
    a restriction unit for restricting use of functions of the information processing device;
    a handwritten input receiving unit;
    a signature input request unit for requesting an input of a handwritten signature;
    an input result sending unit for sending, to a server, a result of a handwritten input which has been input in response to the request from the signature input request unit and received by the handwritten input receiving unit;
    an authorization information input receiving unit for receiving an input of authorization information which has been issued by the server that has received the result of the handwritten input and which shows that the use of the functions of the information processing device is authorized;
    a receiving unit for receiving the authorization information from the server;
    a determining unit for determining whether the input authorization information, the input of which has been received by the authorization information input receiving unit, coincides with the received authorization information received by the receiving unit; and
    a restriction cancellation unit for cancelling the restriction by the restriction unit,
    wherein the restriction cancellation unit cancels the restriction by the restriction unit when the determining unit determines that the input authorization information and the received authorization information coincide.

16. An information processing method in which a computer of an information processing device having a restriction unit for restricting use of functions of the information processing device and a handwritten input receiving unit operates:
    a signature input request unit for requesting an input of a handwritten signature;
    an input result sending unit for sending, to a server, a result of a handwritten input which has been input in response to the request from the signature input request unit and received by the handwritten input receiving unit;
    an authorization information input receiving unit for receiving an input of authorization information issued by the server that has received the result of the handwritten input and which shows that the use of the functions of the information processing device is authorized;
    a receiving unit for receiving the authorization information from the server;
    a determining unit for determining whether the input authorization information, the input of which has been received by the authorization information input receiving unit, coincides with the received authorization information received by the receiving unit; and
    a restriction cancellation unit for cancelling the restriction by the restriction unit,
    wherein the restriction cancellation unit cancels the restriction by the restriction unit when the determining unit determines that the input authorization and the received authorization information coincide.

17. An information processing system including an information processing device, and a server which is communicably connected to the information processing device,
wherein the information processing device comprises:
a restriction unit for restricting use of functions of the information processing device;
a handwritten input receiving unit;
a signature input request unit for requesting an input of a handwritten signature;
an input result sending unit for sending, to a server, a result of a handwritten input which has been input in response to the request from the signature input request unit and received by the handwritten input receiving unit;
an authorization information input unit for accepting an input that corresponds to first authorization information which has been issued by the server in response to reception of the sent handwritten input and which shows the use of functions of the information processing device that are authorized;
a receiving unit for receiving second authorization information from the server;
a determining unit for determining whether the first authorization information coincides with the received second authorization information; and
a restriction cancellation unit for cancelling the restriction by the restriction unit,
wherein the server comprises:
a unit for issuing the authorization information upon receiving the handwritten input result sent by the input result sending unit, and
wherein the restriction cancellation unit cancels the restriction by the restriction unit when the determining unit determines that the accepted first authorization information and the received second authorization information coincide.

18. The information processing system of claim 17, wherein
the receiving unit that receives the second authorization information is a transceiver configured to receive an electronic data message, which includes the second authorization information, which has been transmitted over an electronic communications network from the server to the transceiver of the information processing device, and
the authorization information input unit accepts the input that corresponds to the first authorization information via manual input by a user.

19. The information processing system of claim 17, wherein the issued first authorization information is transmitted, by a transceiver of the server, to a computing device that is separate from the information processing device, the issued first authorization information not electronically transmitted to the information processing device,
wherein the accepted input is a code that corresponds to the issued first issued authorization information.

* * * * *